United States Patent [19]

Asaida et al.

[11] Patent Number: 4,761,685
[45] Date of Patent: Aug. 2, 1988

[54] APPARATUS AND METHOD FOR SOLID-STATE IMAGE SENSOR ELEMENT REGISTRATION ADJUSTMENT

[75] Inventors: Takashi Asaida; Kenichi Aihara, both of Kanagawa, Japan

[73] Assignee: Sony Corporation, Tokyo, Japan

[21] Appl. No.: 32,518

[22] PCT Filed: Jun. 17, 1986

[86] PCT No.: PCT/JP86/00302

§ 371 Date: Feb. 17, 1987

§ 102(e) Date: Feb. 17, 1987

[87] PCT Pub. No.: WO86/07660

PCT Pub. Date: Dec. 31, 1986

[30] Foreign Application Priority Data

Jun. 17, 1985 [JP] Japan ................ 61-131388

[51] Int. Cl.[4] .......................................... H04N 17/00
[52] U.S. Cl. ................... 358/139; 358/213.13
[58] Field of Search ............... 358/139, 10, 106, 107, 358/213.13; 356/430, 388, 392, 393, 394

[56] References Cited

U.S. PATENT DOCUMENTS 4,523,231 6/1985 Therrien ..................... 358/139
4,626,907 12/1986 Schedewie ............... 358/106 X
4,628,342 12/1986 Desmons et al. ......... 358/139 X

FOREIGN PATENT DOCUMENTS 54-61415 5/1979 Japan .
54-92014 7/1979 Japan .
55-91275 7/1980 Japan .
58-162181 9/1983 Japan .
60-154795 8/1985 Japan .

Primary Examiner—James J. Groody
Assistant Examiner—Victor R. Kostak
Attorney, Agent, or Firm—Hill, Van Santen, Steadman & Simpson

[57] ABSTRACT

An apparatus and method for registration adjustment are disclosed, in which when effecting so-called registration adjustment for positioning solid-state image sensor element (31r, 31g and 31b) used for a solid-state image sensor apparatus at predetermined positions of an image sensor optical system (30), a registration adjustment test chart (10) having at least one horizontal or vertical shade recurrence pattern at a recurrence pitch ($\tau p$) in a particular relation to the picture element pitch ($\tau c$) of the solid-state image sensor elements (31r, 31g and 31b) is imaged, and the positional deviation in six directions of the solid-state image sensor elements (31r, 31g and 31b) is measured on the basis of the beat component of the image sensor output of the solid-state image sensor elements (31r, 31g and 31b) based on the difference between the picture element pitch ($\tau c$) and the shade recurrence pitch ($\tau px$).

9 Claims, 9 Drawing Sheets

TEST CHART FOR MEASUREMENT OF REGISTRATION

BLOCK DIAGRAM SHOWING THE CONSTRUCTION OF A REGISTRATION ADJUSTMENT APPARATUS

SCHEMATIC VIEW SHOWING THE RELATION BETWEEN TEST PATTERN AND PICTURE ELEMENT ARRANGEMENT OF CCD

WAVEFORM DIAGRAM OF BEAT COMPONENT

OPERATION PROCEDURE OF
REGISTRATION ADJUSTMENT

EXPLANATION OF TILT AND
SHIFT ADJUSTMENT OPERATION

PATTERN OF TEST CHART

COARSE ADJUSTMENT OF REGISTRATION

EXPLANATION OF ROTATION ADJUSTMENT OPERATION

OPERATION PROCEDURE OF ONE-HALF
PICTURE ELEMENT PITCH OFF-SET ADJUSTMENT

IMAGE SENSOR OUTPUT AFTER ONE-HALF
PICTURE ELEMENT PITCH OFF-SET ADJUSTMENT

SCHEMATIC VIEW SHOWING THE OPERATING DIRECTION
OF REGISTRATION ADJUSTMENT

APPARATUS AND METHOD FOR SOLID-STATE IMAGE SENSOR ELEMENT REGISTRATION ADJUSTMENT

TECHNICAL FIELD

This invention relates to an apparatus and a method for registration adjustment for arranging solid-state image sensor elements, e.g., charge coupled devices (CCD), used as image sensor in a solid-state image sensor apparatus at predetermined positions of an optical system of the image sensor.

BACKGROUND ART

In a color image sensor apparatus, generally a standard color television signal of NTSC system or the like is formed from image sensor outputs, which are obtained by separating the light of a scene into a plurality of component color images through a color separating system and sensing the individual component color images with solid-state image sensors such as CCDs or an image pick-up tube. In a color image sensor apparatus using a plurality of image sensors, it is necessary to reliably maintain the state of overlap of individual component color images obtained from respective image sensors or the state in which so-called registration adjustment is accurately made.

In a conventional color video camera of so-called three-tube type, a three-color separating prism of a color separating system and three image pick-up tubes are mechanically mounted in a housing which is formed by die casting or the like, and the registration adjustment of each image pick-up tube is done by effecting mechanical positional adjustment according to an output signal obtained by picking up a test chart or the like and fine adjusting the image pick-up screen position by utilizing the deflection system of the image pick-up tubes.

In a solid-state color image sensor apparatus using solid-state image sensors such as CCDs as image sensors, unlike the color video camera of the three tube type noted above, electrical image pick-up screen positional adjustment as in the image pick-up tube can not be done. Therefore, a holder made of iron or like material is bonded to each solid-state image sensor for sensing each component color image, while the holder is bonded to each light exit section of the color separating prism of the color separating system. For each image sensor, registration adjustment in six different directions, i.e., (1) adjustment of the center in the horizontal direction (i.e., ±X directions as shown by arrows), (2) adjustment of the center in the vertical direction (i.e., ±Y directions as shown by arrows), (3) adjustment of back focus (i.e., ±Z directions as shown by arrows), (4) adjustment of tilt and shift in the horizontal direction (i.e., ±RX directions as shown by arrows), (5) adjustment of the tilt and shift in the vertical direction (i.e., ±RY directions as shown by arrows) and (6) adjustment of rotation (i.e., ±RZ directions as shown by arrows), is done as shown in FIG. 13, and then both of holders are thermally bonded together by means of soldering. In this way, each solid-state image sensor is mounted by securement on each light exit surface of the color separating prism.

In the meantime, the solid-state image sensor such as CCD is incapable of electric image pick-up screen positional adjustment as in the image pick-up tube. Therefore, in the color image sensor apparatus using a plurality of solid-state image sensors, it is necessary to mechanically maintain a very high precision of the registration of each image sensor. Particularly, in a solid-state color image sensor apparatus adopting a so-called space picture element shift system for increasing the resolution, it is necessary to ensure registration of the order of 1 μm in the afore-mentioned six directions, i.e., ±X, ±Y, ±Z, ±RX, ±RY and ±RZ directions. Therefore, the conventional registration adjustment has requires a great deal of skill and time.

An object of the present invention, accordingly, is to permit registration adjustment in the afore-mentioned six directions in a simple operation and with a high precision.

DISCLOSURE OF THE INVENTION

To solve the above problems, an apparatus and method for the solid-state image sensor element registration adjustment according to the present invention feature that a test chart with a recurring shade pattern formed at a recurrence pitch in a predetermined relation to the solid-state image sensor picture element pitch at least either the horizontal or vertical direction is imaged with the solid-state image sensor noted above and that a beat component in an image sensor output signal from the solid-state image sensor based on the difference between the picture element pitch noted above and the recurrence pitch is detected to measure the positional deviation of the solid-state image sensor in the recurrence pattern direction to effect adjustment of the positional deviation noted above.

According to the present invention, the adjustment is done by measuring the positional deviation in the six directions on the basis of a beat component, which is contained in the output obtained by imaging the registration adjustment test chart with the solid-state image sensor and is based on the difference between the picture element pitch and the recurrence pitch.

BRIEF DESCRIPTION OF THE DRAWINGS

FIGS. 1 to 12 are views illustrating one embodiment of the apparatus and method for the registration adjustment according to the present invention, in which:

FIG. 1 is a block diagram schematically showing the construction of the embodiment of the apparatus for registration adjustment;

FIG. 2 is a schematic view for explaining the relation between the test pattern of the registration adjustment test chart and CCD image sensor picture element arrangement;

FIG. 3 is a schematic view showing a registration adjustment test chart used in the embodiment;

FIG. 4 is a waveform diagram showing a beat component contained in an image sensor output, which is obtained by imaging the test pattern of the registration adjustment test chart with a CCD image sensor;

FIG. 5 is a flow chart showing a procedure of operation of the registration adjustment in the embodiment;

FIG. 6 is a schematic view for explaining the operation of the tilt and shift adjustment in the CCD image sensor in the embodiment;

FIG. 7 is a schematic view showing, to an enlarged scale, a portion of the recurring pattern provided in the registration adjustment test chart in the embodiment in relation to the CCD image sensor picture element arrangement;

FIG. 8 is a schematic view for explaining the operation of coarse adjustment of the registration of the CCD image sensor in the embodiment;

FIG. 9 is a waveform diagram showing a beat component used in the operation of the rotation adjustment of the CCD image sensor in the embodiment;

FIG. 10 is a waveform diagram showing, to an enlarged scale, a waveform in the neighborhood of the zero crossing position of the beat component;

FIG. 11 is a flow chart showing the procedure of the one/half off-set adjustment of the CCD image sensor in the embodiment; and FIG. 12 is a waveform diagram showing the beat component used in the one-half off-set adjustment.

BEST MODE FOR EXECUTING THE INVENTION

Now, one embodiment of the apparatus and method for the solid-state image sensor element registration adjustment according to the present invention will be described in detail with reference to the accompanying drawings.

FIGS. 1 to 12 illustrate an embodiment of the present invention applied to the registration adjustment apparatus for adjusting the registration of a three-plate type CCD color video camera.

Figure 1:
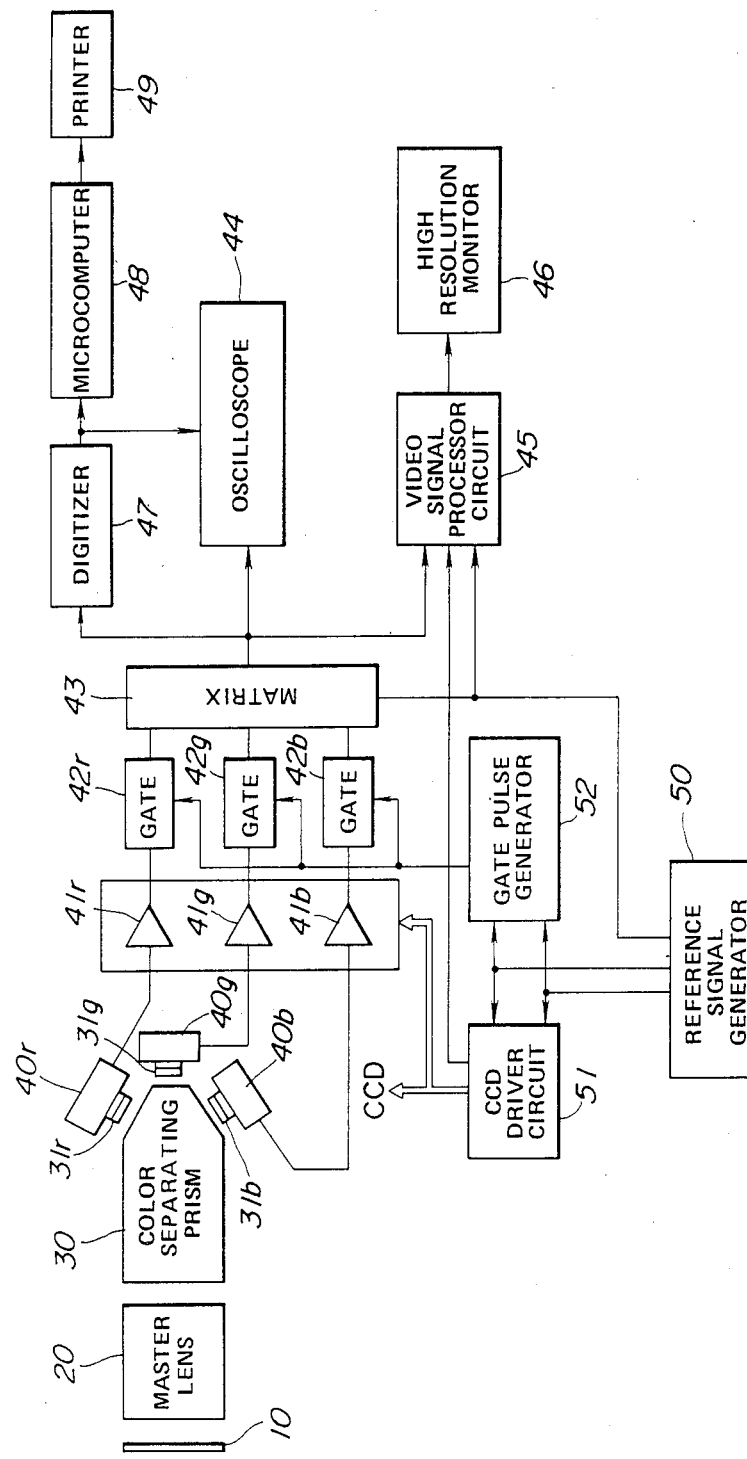

In the registration adjustment apparatus of the embodiment, as schematically shown in FIG. 1, a registration adjustment test chart 10 with a predetermined test pattern is disposed in front of a master lens 20. The imaged light representing the test pattern of the registration adjustment test chart 10 is led through the master lens 20 to a color separating prism 30 of the three-plate type CCD color video camera. The color separating prism 30 splits the imaged light spectrally into three primary color light fluxes R, G and B, i.e., red, green and blue color components R, G and B of light, which illuminate respective three CCD image sensors 31r, 31g and 31b. The CCD image sensors 31r, 31g and 31b are mounted on respective position adjustment members 40r, 40g and 40b for effecting the positioning of 6-dimensions. The individual CCD image sensors 31r, 31g and 31b are driven by a CCD driver circuit 51 which is operated according to a reference signal supplied by a reference signal generator 50. The images of the color components of the imaged light obtained by spectral splitting in the color separating prism 30, i.e., test patterns are thus imaged. The outputs of the CCD image sensors 31r, 31g and 31b are supplied from pre-amplifiers 41r, 41g and 41b through gate circuits 42r, 42g and 42b to a matrix circuit 43. To the gate circuits 42r, 42g and 42b are supplied a gate pulse generated by a gate pulse generator circuit 52 operated according to the reference signal.

An image output signal obtained from the matrix circuit 43 is supplied to an oscilloscope 44 for waveform observation, and it is supplied through a video signal processor circuit 45 to a high resolution monitor 46. Further, it is supplied through a digitizer 47 to a microcomputer 48.

The registration adjustment test chart 10 supplies to the CCD image sensor 31 an image of a recurring shade pattern PT having a shade recurrence pitch $\tau p$ which is related to the picture element pitch $\tau c$ of the CCD image sensor 31 as $$\tau p = 2\tau c \pm \Delta \qquad (1)$$

Figure 2:
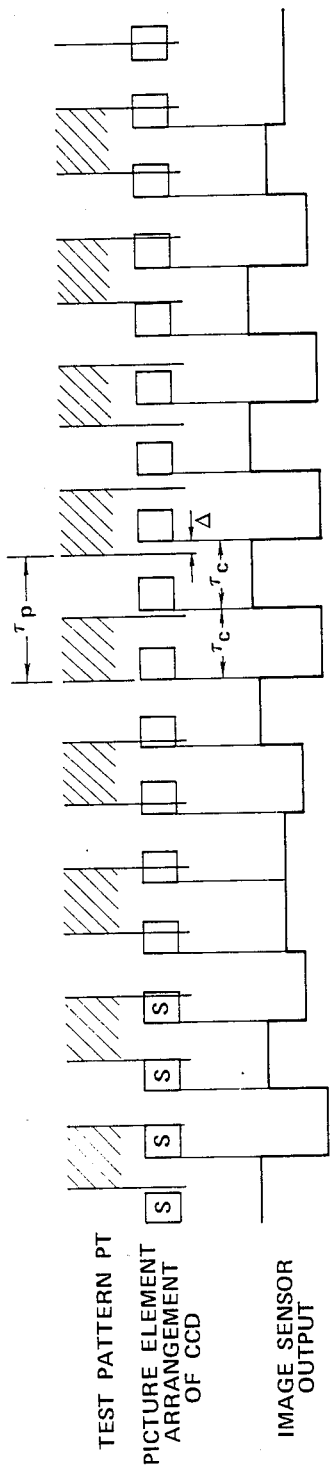

(where $\Delta$ is set as $\Delta = \tau c \cdot \tau p / \tau p$ where $\tau o$ is the size of the effective image area in the direction of the picture element arrangement), as schematically shown in FIG. 2.

Figure 3:
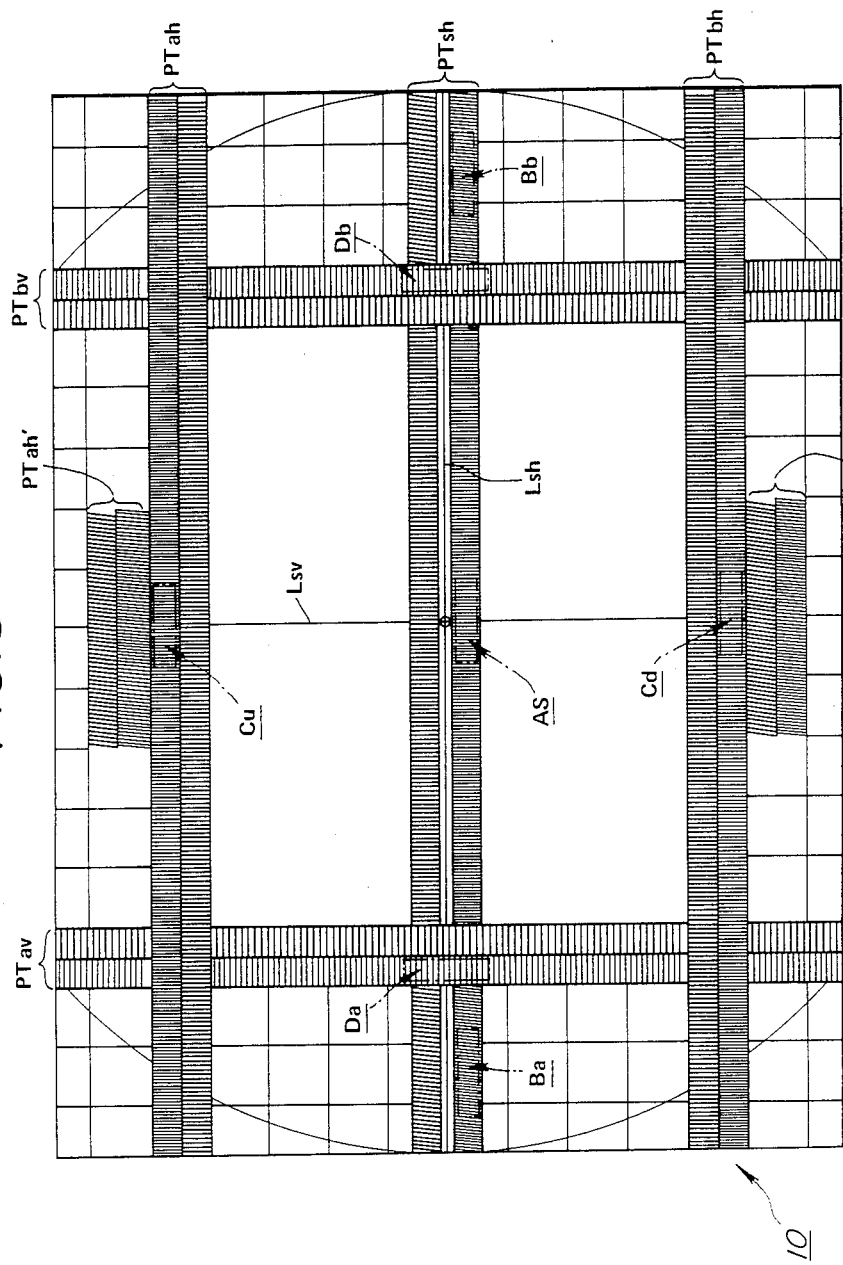
Figure 5:
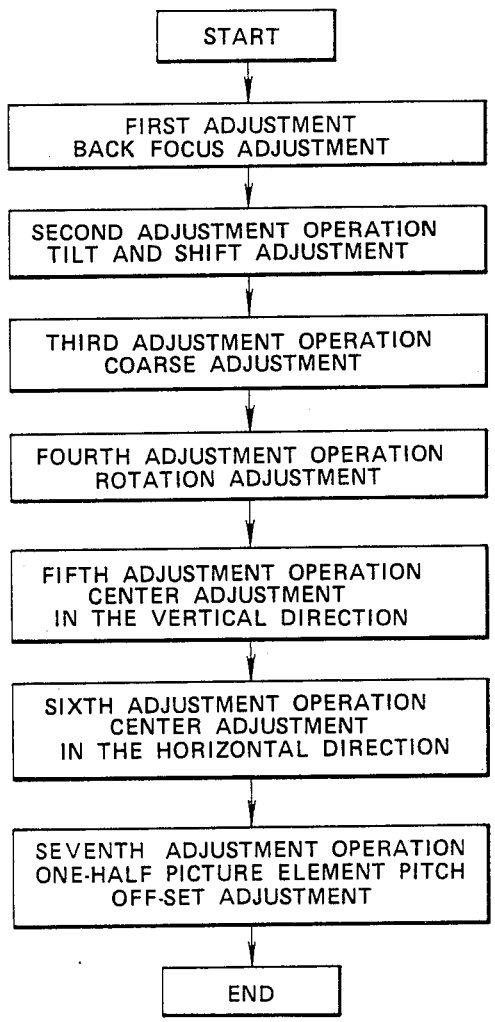

The registration adjustment test chart 10 in the embodiment has a test pattern as schematically shown in FIG. 3. As is shown, it has a vertical stripe recurring pattern PTsh having a recurring shade pattern along a horizontal center line Lsh, two vertical stripe recurring patterns PTah and PTbh symmetrical with respect to and parallel to the horizontal center line Lsh and two horizontal stripe recurring patterns PTav and PTbv symmetrical with respect to and parallel to a vertical center line Lsv.

The vertical stripe recurring patterns PTsh, PTah and PTbn each repeat a shade pattern at a recurrence pitch $\tau_{ph}$ in the relation of the first equation to the horizontal picture element pitch $\tau_{ch}$ of the CCD image sensor 31. The horizontal stripe recurring patterns PTav and PTbv each has a recurring shade pattern at a recurrence pitch $\tau_{pv}$ in the relation of the first equation to the vertical picture element pitch $\tau_{cv}$ of the CCD image sensor 31.

In this embodiment, a single test chart is used commonly for the CCD image sensors having two different kinds of picture element arrangements corresponding to the specifications of CCIR and EIA. Therefore, two kinds of test patterns corresponding to the specifications of CCIR and EIA are provided in parallel to each other so that the registration adjustment can be effected.

Figure 4:
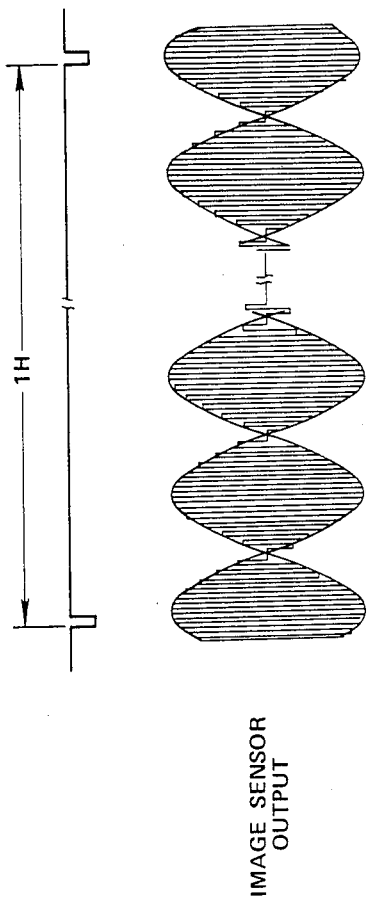

With the generation of the moire pattern based on the difference between the recurrence pitch $\tau p$ of the recurrence pattern PT and the picture element pitch $\tau c$, the signal level of the image sensor output obtained from the CCD image sensor 31, on which the imaged light of the test pattern of the registration adjustment test chart 10 is projected, is varied according to the relative position of the recurrence pattern PT and picture elements S as shown in FIG. 2. More specifically, the image sensor output with respect to the horizontal recurrence pattern PTh contains $\Delta$ beat components in one horizontal scanning period (1 H) as shown in FIG. 4.

The beat component which is contained in the image sensor output signal obtained through imaging of the recurrence pattern of the registration adjustment test chart 10 with the CCD image sensor 31, has an amplitude varying in dependence on the back focus of the image sensor optical system and tilt and shift amount of the solid-state image sensor element, i.e., registration error in the ±Z, ±RX and ±RY directions, and a phase varying in dependence on the center position of the solid-state image sensor element and rotation, i.e., registration errors in the ±X, ±Y and ±RZ directions.

In this embodiment, the CCD image sensors 31r, 31g and 31b of the registration adjustment apparatus mounted on the position adjustment members 40r, 40g and 40b, are driven, and in this state the recurrence pattern of the registration adjustment test chart 10 is imaged. With respect to the outputs of the CCD image sensors 31r, 31g and 31b, the position adjustment members 40r, 40g and 40b are operated while performing the waveform observation of the beat component by the oscilloscope 44 or waveform analysis by the microcomputer 48. In this way, 6-dimension positioning of the CCD image sensors 31r, 31g and 31b is done by performing six adjustment operations in the order of a first adjustment operation for the back focus adjustment, a second adjustment operation for the tilt and shift amount adjustment, a third adjustment operation for coarse adjustments of the center adjustment and rotation adjustment, a fourth adjustment operation for the rotation adjustment, a fifth adjustment operation for the center adjustment in the vertical direction and a sixth adjustment operation for the center adjustment in the horizontal direction as shown in flow chart of FIG. 5. Further, a one-half image sensor pitch off-set adjustment of the CCD image sensor 31g for the green color imaging, is done in a seventh adjustment operation.

In the first adjustment operation, with respect to the image sensor output signal obtained by imaging the recurrence pattern of the registration adjustment test chart 10 with the CCD image sensors 31r, 31g and 31b through the master lens 20, the image output of the central portion AS of the vertical stripe recurrence pattern PTsh having a shade recurrence pattern along the horizontal center line Lsh, as schematically shown in FIG. 3, is selectively taken out through the gate circuits 42r, 42g and 42b. More specifically, the image output of a central portion of the image sensor screen subject to less influence of axial aberation or color magnification aberation of the image sensor optical system is taken out. The amplitude of the beat component contained in the image output of the central portion AS noted above is varied in dependence on the registration error in the ±Z direction or back focus of the image sensor optical system, and is maximum when each of the CCD image sensors 32r, 32g and 31b is at the position of the right focus.

Accordingly, the position adjustment members 40r, 40g and 40b are operated while effecting waveform observation of the beat component contained in the image output of the central portion AS by the oscilloscope 44, and the CCD image sensors 31r, 31g and 31b are moved up to the positions, at which the amplitude of the node of the beat component is maximum, whereby it is possible to permit positional adjustment of the CCD image sensors 31r, 31g and 31b to the position of the right focus, i.e., back focus adjustment.

In the back focus adjustment, the registration adjustment test chart 10 is imaged with the CCD image sensors 31r, 31g and 31b through the master lens 20 by holding the diaphragm of the image sensor optical system in a fully open state and setting a focal depth shallowly.

In the second adjustment operation, the tilt and shift adjustment in the horizontal and vertical directions, is done for the CCD image sensors 31r, 31g and 31b by utilizing opposite end positions Ba and Bb of the vertical stripe recurrence pattern PTsh with a shade recurrence pattern along the horizontal center line Lsh of the registration adjustment test chart 10 and central portions Cu and Cd of the two vertical stripe recurrence patterns PTah and PTbh symmetrical with respect to and parallel to the center line Lsh.

In the tilt and shift adjustment in the horizontal direction in the second adjustment operation, with respect to the image sensor output signal obtained by imaging the recurrence pattern of the registration adjustment test chart 10 with the CCD image rensors 31r, 31g and 31b through the master lens 20, image outputs of the opposite side portions Ba and Bb of the vertical stripe recurrence pattern PTsh having a shade recurrence pattern along the horizontal center line Lsh as schematically shown in FIG. 3 are selectively taken out through the gate circuits 42r, 42g and 42b.

The amplitude of the beat component contained in the image outputs of the opposite side portions Ba and Bb has the level difference depending on the horizontal tilt and shift amount of the CCD image sensors 31r, 31g and 31b or registration error in the ±RX directions noted above.

Accordingly, the position adjustment members 40r, 40g and 40b are operated while effecting waveform observation of the beat component contained in the image output of the opposite side portions Ba and Bb with the oscilloscope 44, and the CCD image sensors 31r, 31g and 31b are moved in parallel up to the positions, at which the amplitude of the node of the beat component is maximum, whereby the right focus positions Pa and Pb of the CCD image sensors 31r, 31g and 31b with respect to the opposite side portions Ba and Bb of the recurrence pattern PTsh are detected.

Figure 6:
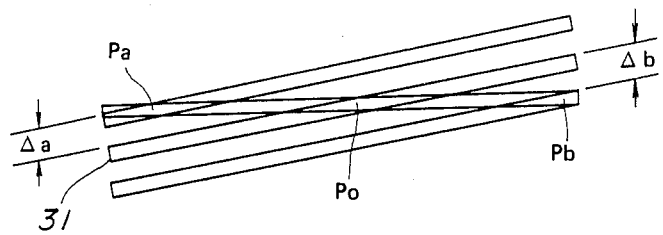

The displacement up to each of the right focus positions Pa and Pb from the initial position PO of the CCD image sensor 31 after the back focus adjustment obtained through the first adjustment operation, as shown in FIG. 6, is measured to obtain measurement outputs $\Delta a$ and $\Delta b$, the tilt and shift amount of the CCD image sensor 31 is calculated from the measurement outputs $\Delta a$ and $\Delta b$, and the tilt and shift adjustment is done by repeatedly executing the adjustment operation a couple of times such that $\Delta a = \Delta b = 0$.

In the tilt and shift adjustment, we can not obtain $|\Delta a| = |\Delta b|$ at all time due to the curving of the image surface, but value is converged to the value by repeatedly performing the adjustment.

Figure 7:
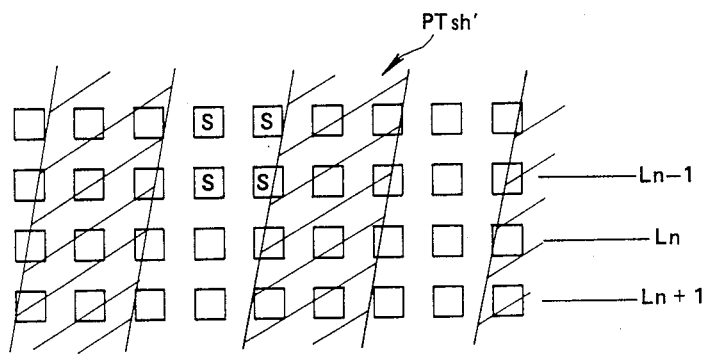

The opposite side portions Ba and Bb of the vertical stripe recurrence pattern PTsh with a shade recurrence pattern along the center line Lsh of the registration adjustment test chart 10 utilized for the tilt and shift adjustment in the horizontal direction, as shown to an enlarged scale in FIG. 7, is formed to be a vertical stripe shade recurrence pattern PTsh', which has a shade recurrence pattern at a recurrence pitch in the relation of the first equation to the horizontal picture element pitch of the CCD image sensor 31 and is inclined with respect to the direction of the picture element arrangement of the CCD image sensor 31, i.e., horizontal direction.

If the stripe shade recurrence pattern PTsh' which is inclined in the direction of the picture element arrangement of the CCD image sensor 31 is to be imaged with the CCD image sensor 31, the phase of the beat component is varied between vertically adjacent horizontal lines Ln and Ln ±1 according to the inclination of the shade recurrence pattern PTsh'. Thus, by selecting the horizontal line with the gate circuits 42r, 42g and 42b adjustment can be obtained such that the node of the beat component can be reliably gated.

The tilt and shift adjustment in the vertical direction in the second adjustment operation, with respect to the image sensor output signal obtained through imaging of the recurrence pattern of the registration adjustment test chart 10 with the CCD image sensor 31r, 31g and 31b, is done in the same procedure as the tilt and shift adjustment operation in the horizontal direction by operating the position adjustment members 40r, 40g and 40b while effecting waveform observation of the beat component contained in the image outputs of the central portions Cu and Cd of the two vertical fringe-like shade recurrence patterns PTah and PTbh symmetrical with respect to and parallel to the horizontal center line Lsh by the oscilloscope 44.

In this embodiment, stripe shade recurrence patterns PTah' and PTbh' having an inclination with respect to the direction of the picture element arrangement of the CCD image sensor 31 are provided on the outer sides of the central portions Cu and Cd of the two vertical stripe shade recurrence patterns PTah and PTbh of the registration adjustment test chart 10.

The image pick-up plane of each of the CCD image sensors 31r, 31g and 31b is determined by the above back focus adjustment and tilt and shift adjustment.

In the third adjustment operation, the coarse adjustment of the horizontal and vertical center adjustment and rotation adjustment is effected with respect to each of the CCD image sensors 31r, 31g and 31b, for which each image pick-up plane is determined, by utilizing the horizontal and vertical center lines Lsh and Lsv of the registration adjustment test chart 10 through the back focus adjustment and tilt and shift adjustment in the following way.

Figure 8:
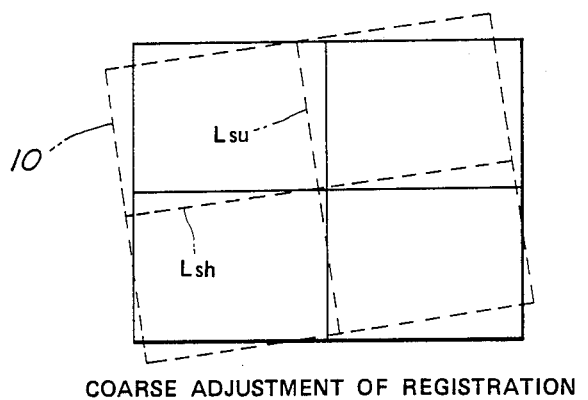

More particularly, since the picture element positioned at the center of the image pick-up screen of the CCD image sensor 31 is determined, a cross-shaped reference image with this picture element as the center is displayed on the screen of the high resolution monitor 46 as shown by solid lines in FIG. 8. the registration adjustment test chart 10 is imaged with each of the CCD image sensors 31r, 31g and 31b, and each of the position adjustment members 40r, 40g and 40b is operated such that the images of the horizontal and vertical center lines Lsh and Lsv of the monitored registration adjustment test chart 10 as shown by dashed lines in FIG. 8 coincide with the cross-shaped reference image.

In the third adjustment operation, the center of each of the CCD image sensors 31r, 31g and 31b in the horizontal and vertical directions and rotation are coarsely adjusted to about ±3 μm, and the registration adjustment of the CCD image sensors 31r, 31g and 31b is done within one/half picture element pitch with respect to the registration adjustment test chart 10.

In the fourth adjustment operation, with respect to the image sensor output signal obtained by imaging the shade recurrence pattern of the registration adjustment chart 10 with the CCD image sensor 31r, 31g and 31b through the master lens 20, the image outputs of the central portions Cu and Cd of the two vertical stripe shade recurrence patterns PTah and PTbh symmetrical with respect to and parallel to the horizontal center line Lsh as schematically shown in FIG. 3, are selectively taken out through the gate circuits 42r, 42g and 42b. The beat component contained in the image outputs of the central portions Cu and Cb of the opposite side portions, has the registration difference in the ±RZ direction, i.e., phase difference corresponding to the rotation difference of the CCD image sensor 31.

Figure 9:
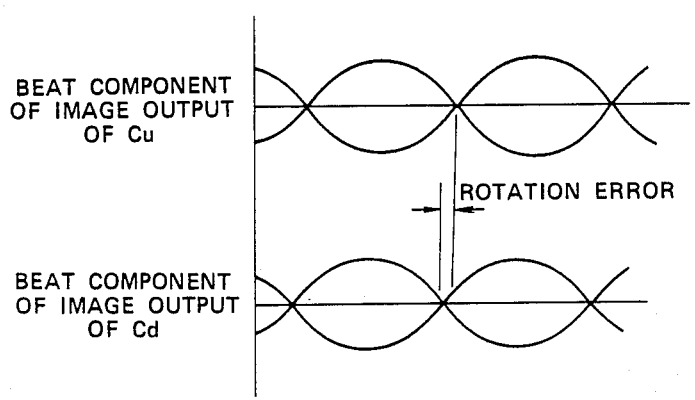

The position adjustment members 40r, 40g and 40b are operated while effecting the waveform observation of each beat component contained in the image outputs of the central portions Cu and Cd in the opposite side portions with the oscilloscope 44, as shown in FIG. 9, and the CCD image sensors 31r, 31g and 31b are rotated up to position, at which the phases of the beat components coincide. In this way, the rotation adjustment can be effected.

Since the phase difference of each beat component contained in the image outputs of the central portions Cu and Cd of the opposite side portions, i.e., rotation error, has been coarsely adjusted in one-half picture element pitch by the afore-mentioned third adjustment operation, it is possible to obtain a reliable and very high accuracy rotation adjustment in the fourth adjustment operation.

In the fifth adjustment operation, with respect to the image sensor output signal obtained by imaging the shade recurrence pattern of the registration adjustment test chart 10 with the CCD image sensors 31r, 31g and 31b through the master lens 20, the image outputs of the central portions Da and Db of the two horizontal stripe shade recurrence patterns PTav and PTbv symmetrical with respect to and parallel to the vertical center line Lsv as schematically shown in FIG. 3 is selectively taken out through the gate circuits 42r, 42g and 42b. Each beat component contained in the image outputs of the central portions Da and Db has the phase difference corresponding to the vertical registration error of the CCD image sensor 31.

Accordingly, the position adjustment members 40r, 40g and 40b are operated while effecting the waveform observation of each beat component contained in the image outputs of the central portions Da and Db of the opposite side portions with the oscilloscope 44, the CCD image sensors 31r, 31g and 31b are displaced up to the positions, at which the phases of the individual beat components coincide. In this way, the center adjustment in the vertical direction can be effected.

In the sixth adjustment operation, like the center adjustment in the vertical direction noted above, the position adjustment members 40r, 40g and 40b are operated while effecting the waveform observation of each beat component contained in the image outputs of the central portions Cu and Cd in the opposite side portions of the two parallel stripe shade recurrence patterns PTah and PTbh with the oscilloscope 44, and the CCD image sensors 31r, 31g and 31b are displaced horizontally up to the positions, at which the phases of the beat components coincide. In this way, the center adjustment in the horizontal direction can be effected.

For each of the CCD image sensors 31r, 31g and 31b, the registration adjustments in all the six directions, i.e., (1) center adjustment in the horizontal direction (i.e, ±X directions as shown by arrows), (2) center adjustment in the vertical direction (i.e., ±Y directions as shown by arrows), (3) back focus adjustment (i.e., ±Z directions as shown by arrows), (4) tilt and shift adjustment in the horizontal directions (i.e., ±X direction as shown by arrows), (5) tilt and shift adjustment in the vertical directions (i.e., ±RY directions as shown by arrows) and (6) rotation adjustment (i.e., ±RZ directions as shown by arrows), are completed with very high precision.

Figure 10:
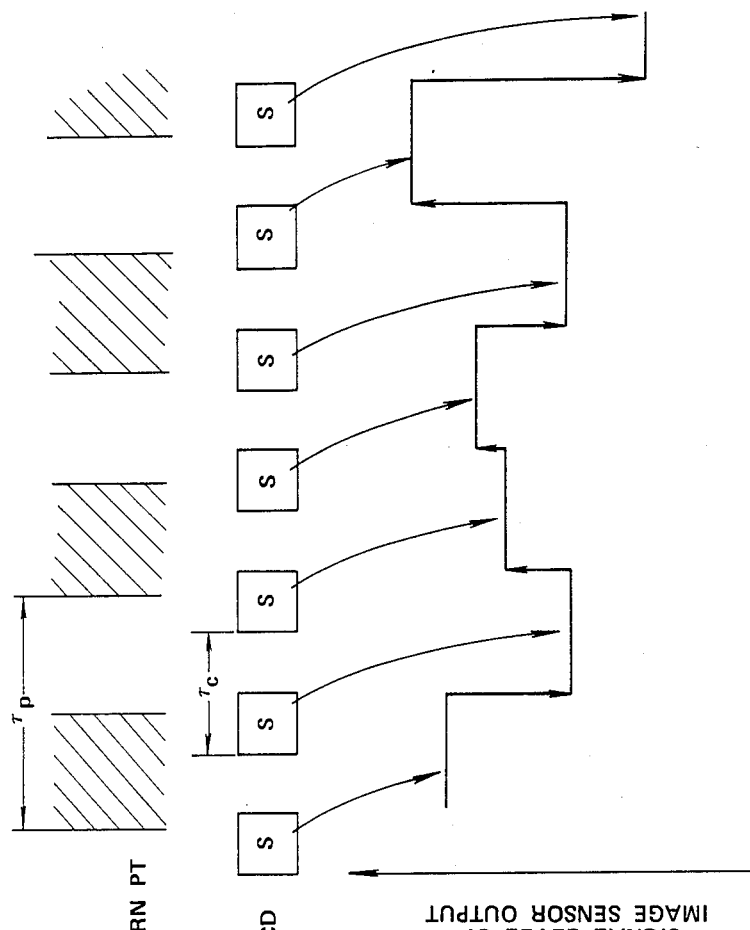

With the beat component contained in the image sensor output of the CCD image sensor 31 with the picture element pitch of τc, representing a shade recurrence pattern PT at the shade recurrence pitch τp shown in the first equation provided in the registration adjustment test chart 10, the signal level for each picture element of the image sensor output corresponding to each picture element S of the CCD image sensor 31 is varied twice consequtively at zero crossings as shown in FIG. 10 showing the waveform in the neighborhood of the zero crossing, to an enlarged scale. Thus, by detecting the signal level change state of the image sensor output for each picture element it is possible to detect the zero crossing position of the beat component, i.e., the phase of the beat component.

In this embodiment, when performing the center adjustment by making use of the phase of the beat component contained in the image sensor output or rotation adjustment, the signal of the beat component is supplied to the oscilloscope 44 for waveform observation, data obtained by digitalizing the signal level of the beat component with the digitizer 47 is supplied to the microcomputer 48, the zero crossing position is calculated in an internal processing at a high precision from a plurality of signal level data corresponding to picture elements at zero crossing positions, at which the signal level is changed twice consecutively in the same direction, and picture elements in the neighborhood of these picture elements, and the result of calculation is supplied to a printer 49.

Figure 11:
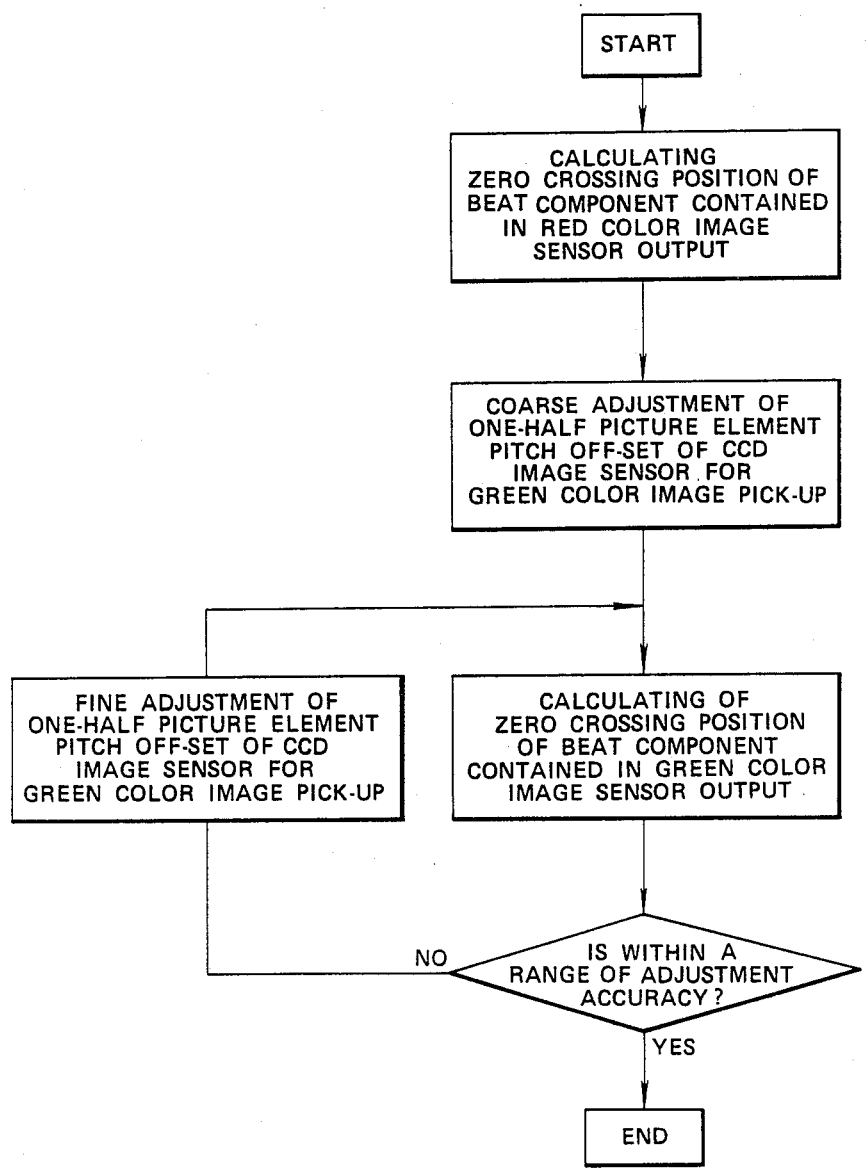
Figure 12:
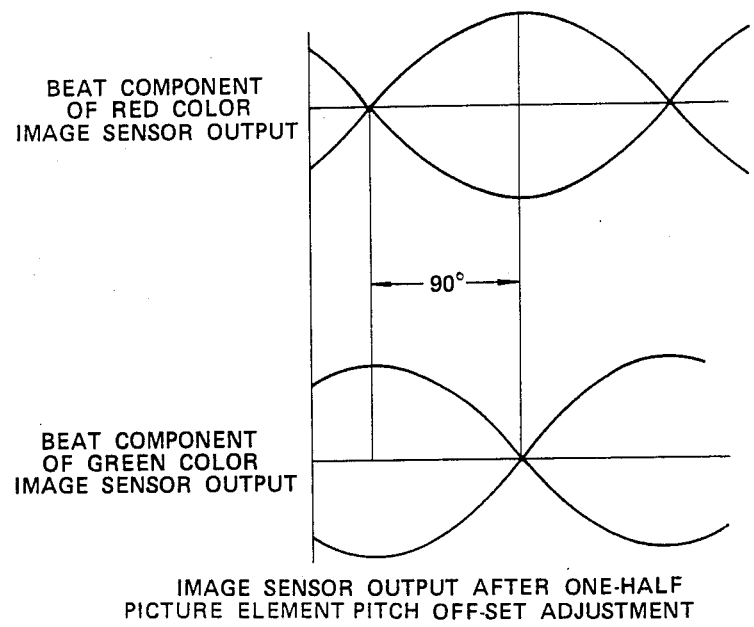
Figure 13:
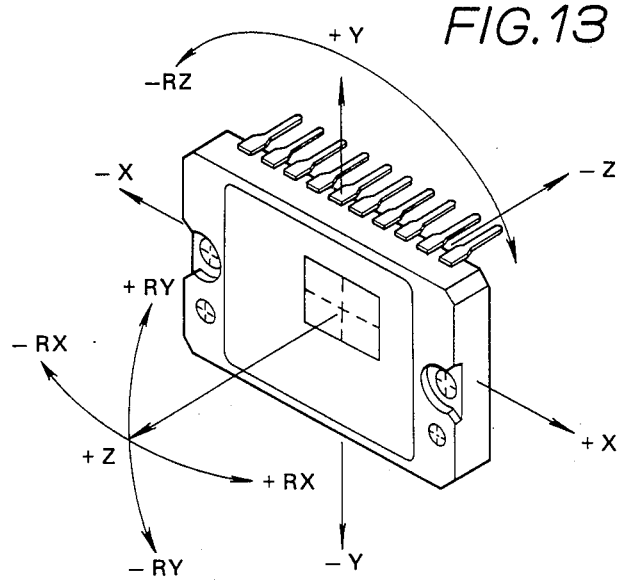
FIG. 13 is a perspective view showing the CCD image sensor for explaining the direction of operation of adjustment in the general registration adjustment.

In this embodiment, when performing the registration adjustment of the color video camera adopting the space picture element shift method, the seventh adjustment operation of the procedure shown in the flow chart of FIG. 11 is performed with respect to the CCD image sensors 31r, 31g and 31b, for which the registration adjustment in the six directions have been done, in the first to sixth adjustment operations by making use of the image sensor output of the central portion SB of the vertical stripe shade recurrence pattern PTsh. Also, the one-half picture element pitch off-set adjustment is done by causing the horizontal displacement of the CCD image sensor 31g for green color such that the beat component contained in the image sensor output of the CCD image sensor 31g for green color and the beat components contained in the image sensor outputs of the other CCD image sensors 31r and 31b are 90 degree out of phase with respect to one another as shown in FIG. 12.

In this seventh adjustment operation, the signal level of the beat component of the image sensor output of the registration adjustment test chart 10 as obtained from the CCD image sensor 31r for red color is digitalized by the digitizer 47, and the zero crossing position of the beat component contained in the image sensor output of the central portion SB of the vertical stripe shade recurrence pattern PTsh is calculated from the signal level data in the microcomputer 48.

Then, coarse adjustment of the one-half picture element pitch off-set of the CCD image sensor 31g for green color in the predetermined direction is done, and the registration adjustment test chart 10 is imaged with the CCD image sensor 31g for green color.

The signal level of the beat component of the image sensor output of the central portion SB of the vertical stripe shade recurrence pattern PTsh obtained from the CCD image sensor 31g for green color is digitalized by the digitizer 47 and then supplied to the microcomputer 48. With respect to the beat component contained in the image sensor output of the CCD image sensor 31g for green color, the microcomputer 48 calculates the signal level data with respect to the first zero crossing position by starting from the zero crossing position of the beat component of the CCD image sensor 31r for red color having been calculated before.

A check is made as to whether the phase of the beat component of the CCD image sensor 31g for green color that has been calculated in the above way, i.e., zero crossing position, is 90 degree out of phase, i.e., one-half picture element pitch off-set, with respect to the phase of the beat component of the CCD image sensor 31r for red color, i.e., zero crossing position. When the zero crossing position of the beat component of the CCD image sensor 31g for green color is not in a desired adjustment accuracy range, fine adjustment of the CCD image sensor 31g of green color is done, the zero crossing position of the beat component is calculated with respect to the image sensor output obtained by the CCD image sensor 31g for green color, the zero crossing position is determined, and the fine adjustment operation is repeated until the result is in a desired adjustment accuracy range, thus completing the one-half picture element pitch off-set adjustment of the CCD image sensor 31g for green color.

In this embodiment, in the first adjustment operation the back focus adjustment is done by utilizing the central portion AS of the vertical stripe shade recurrence pattern PTsh with a shade recurrence pattern along the horizontal center line Lsh of the registration adjustment test chart 10. In the second adjustment operation the tilt and shift adjustment in the horizontal direction is done by making use of the opposite side portions Ba and Bb of the vertical stripe shade recurrence pattern PTsh. Also, the tilt and shift adjustment in the vertical direction is done by making use of the central portions Cu and Cd of two vertical stripe shade recurrence patterns PTah and PTbh symmetrical with respect to and parallel to the horizontal center line Lsh. In the third adjustment operation, coarse adjustment consisting of the center adjustment in the horizontal and vertical directions and rotation adjustment are done by making use of the horizontal and vertical center lines Lsh and Lsv of the registration adjustment test chart 10. In the fourth adjustment operation, the rotation adjustment is done by utilizing the central portions Cu and Cd of the two vertical stripe shade recurrence patterns PTah and PTbh symmetrical with respect to and parallel to the horizontal center line Lsh. In the fifth adjustment operation, the center adjustment in the vertical direction is done by making use of the central portions Da and Db of the two horizontal stripe shade recurrence patterns PTav and PTbv symmetrical with respect to and parallel to the vertical center line Lsv of the registration adjustment test chart 10. In the sixth adjustment operation, the center adjustment in the horizontal direction is done by making use of the central portions Cu and Cd of the two parallel stripe shade recurrence patterns PTah and PTbh. In the seventh adjustment operation, one-half picture element pitch off-set adjustment of the CCD image sensor 31g for green color is done by utilizing the central portion SB of the vertical stripe shade recurrence pattern PTsh.

We claim:

1. An apparatus for solid-state image sensor element registration adjustment, characterized in that:
   a test chart having a shade recurrence pattern having a recurrence pitch in a predetermined relation to the picture element pitch of solid-state image sensor elements of a solid state image sensor in either the horizontal or the vertical direction is imaged with the solid-state image sensor elements, of the image sensor output signals obtained from said solid-state image sensor elements the beat component based on the difference between said picture element pitch and the shade recurrence pitch is detected, and the positional deviation of said solid-state image sensor elements in said shade recurrence pattern direction is measured to adjust the positional deviation.

2. An apparatus for solid-state image sensor element registration adjustment according to claim 1, wherein said test chart has at least one shade recurrence pattern in the horizontal and vertical directions, the recurrence pitch is in a predetermined relation to the picture element pitch of said solid-state image sensor elements in the horizontal and vertical directions, at least a pair of shade recurrence patterns are projected on said solid-state image sensor elements, and the positional deviation of said solid-state image sensor elements in the horizontal and vertical directions is measured according to the image sensor output signal obtained from said solid-state image sensor elements.

3. An apparatus for solid-state image sensor element registration adjustment according to claim 2, wherein said test chart has a stripe recurrence pattern having an inclination with respect to the direction of picture element arrangement of the solid-state image sensor elements.

4. An apparatus for solid-state image sensor element registration adjustment according to one of claims 2 or 3, wherein said test chart has two shade recurrence patterns of different shade recurrence pitches in the horizontal and vertical directions.

5. An apparatus for solid-state image sensor element registration adjustment according to claim 1, wherein a zero crossing position of the beat component based on the difference between said picture element pitch and the shade recurrence pitch in image sensor output signals obtained from said solid-state image sensor elements is detected by detecting that the level of the image sensor output corresponding to each picture element of the solid-state image sensor element is varied twice consecutively in the same direction.

6. An apparatus for solid-state image sensor element registration adjustment according to claim 1, wherein a test chart with a shade recurrence pattern having a shade recurrence pitch in a predetermined relation to the picture element pitch of said solid-state image sensor elements in said horizontal or vertical directions at a position corresponding to at least the center position of the image sensor screen of the solid-state image sensor element is imaged with said solid-state image sensor element through an image pick-up lens, the beat component of the image sensor output signal of the shade recurrence pattern corresponding to the center portion of said image based on the difference between said picture element pitch and the shade recurrence pitch is detected, said solid-state image sensor element is moved in the direction of the optical axis of said image pick-up lens, and said solid-stage image sensor element is secured at a position, at which said detection output is maximum, whereby the back focus adjustment of said solid-state image sensor element is effected.

7. An apparatus for solid-state image sensor element registration adjustment according to claim 1, wherein a test chart with a pair of shade recurrence patterns having a shade recurrence pitch in a predetermined relation to the picture element pitch of said solid-state image sensor elements in the horizontal or vertical direction at a central portion of the image pick-up screen of the solid-state image sensor element and at positions on vertically or transversally opposite sides of said central portion is imaged with a solid-state image sensor element using an image pick-up lens, said solid-state image sensor element is moved in the direction of optical axis of said image pick-up lens while detecting the beat component of the image sensor output signal of the shade recurrence pattern corresponding to the central portion of said image according to the difference between said picture element pitch and the shade recurrence pitch, the position, at which said detection output is maximum, is made the initial position, a first measurement output is obtained by moving said solid-state image sensor element in the direction of optical axis of said image pick-up lens while detecting the beat component of the image sensor output of a shade recurrence pattern corresponding to one of the left or right side or upper or lower side of said screen, and measuring the distance covered between said initial position and a second position, at which said detection output is maximum, obtaining a second measurement output by moving said solid-state image sensor element in the direction of optical axis of said image pick-up lens while detecting the beat component of the image sensor output of the other shade recurrence pattern corresponding to either left or right side or upper or lower side of said screen and measuring the distance covered between said initial position and a third position, at which said detection output is maximum, and the tilt and shift amount of said solid-state image sensor element is calculated from said first and second measurement outputs.

8. An apparatus for solid-state image sensor element registration adjustment according to claim 1, wherein a test chart with a pair of shade recurrence patterns having a shade recurrence pitch in a predetermined relation to the picture element pitch of the solid-state image sensor element in the horizontal or vertical direction on the left or right side or upper or lower side of the central portion of the image pick-up screen of the solid-state image sensor element is imaged with said solid-state image sensor element, a pair of beat components of the image sensor output signal of the pair of shade recurrence patterns corresponding to the transversal or vertical side portion of the screen are detected, the solid-state image sensor element is rotated about the central portion, and the rotation is stopped at a position, at which the phases of said pair of beat components coincide, whereby said solid-state image sensor rotation adjustment is effected.

9. A method for adjusting the registration of solid-state image sensor elements comprising the steps of:
imaging a shade recurrence pattern having a shade recurrence pitch in a predetermined relation to the picture element pitch of the solid-state image sensor elements of a solid-state image sensor in either horizontal or vertical direction with said solid-state image sensor element;
detecting a beat component of the image sensor output signal of said solid-state image sensor element based on the difference between said picture element pitch and the shade recurrence pitch to measure the positional deviation of said solid-state image sensor element in the direction of the shade recurrence pattern, thereby effecting adjustment of the positional deviation.

* * * * *